March 27, 1962 R. A. SAUDER 3,026,838
TANK SUPPORTING AND TURNING APPARATUS
Filed Feb. 11, 1958 2 Sheets-Sheet 1

INVENTOR
Robert A. Sauder
BY Bacon & Thomas
ATTORNEYS

March 27, 1962 R. A. SAUDER 3,026,838
TANK SUPPORTING AND TURNING APPARATUS
Filed Feb. 11, 1958 2 Sheets-Sheet 2
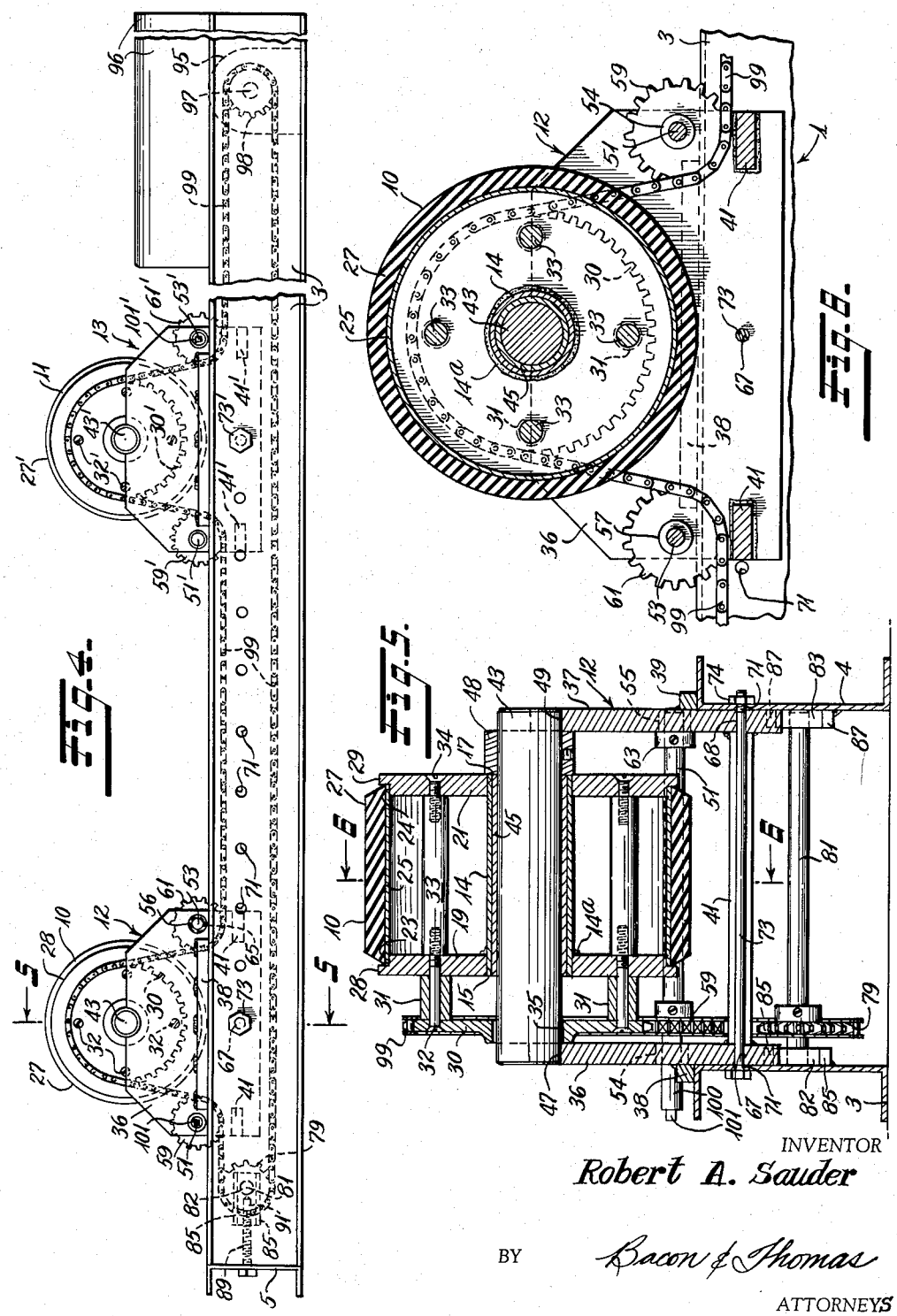
INVENTOR
Robert A. Sauder
BY Bacon & Thomas
ATTORNEYS United States Patent Office
3,026,838
Patented Mar. 27, 1962

3,026,838
TANK SUPPORTING AND TURNING APPARATUS
Robert A. Sauder, 2000 Morningside Drive,
Emporia, Kans.
Filed Feb. 11, 1958, Ser. No. 714,653
5 Claims. (Cl. 113—130)

The present invention relates generally to an apparatus for supporting and turning cylindrical objects, and more specifically to an apparatus adapted to support and rotate tanks of varying diameters during operations such as circumferential welding.

In operations of the type described, the tank is normally cradled between sets of rolls or wheels, selected rolls or wheels being driven to impart rotation to the tank at a predetermined speed relative to a fixed welding head. Where tanks of different diameters are fabricated, it is necessary to vary the distance between the wheels of the respective sets to provide adequate support. Ordinarily, the spacing is varied by moving one wheel of each set laterally, but it is to be noted that in this type of adjustment the center line between the two sets of wheels is moved laterally, and the axis of any tank supported thereon is correspondingly moved laterally. The result is, that the position of the welding head must also be adjusted laterally every time the wheels are shifted.

The foregoing objections are eliminated by the present invention which provides apparatus that makes it possible to keep the center line between the wheels, and the axis of the tank being supported thereby, in a vertical plane common to a fixed welding head, while permitting the lateral spacing between the supporting wheels to be adjusted along trackways to suit a wide range of tank diameters. The correlation of the tank supporting wheels with a fixedly located welding head eliminates lateral adjustment of the welding head in that it need only be raised or lowered to operate on tanks of different diameters positioned on the supporting wheels.

Accordingly, it is a primary object of the present invention to provide a tank supporting and turning apparatus wherein the spacing between the tank supporting wheels can be adjusted to accommodate tanks of various diameters.

Another object is to provide a tank supporting and turning apparatus wherein the distance between the tank supporting wheels may be adjusted, but wherein the axis of any tank being supported will remain in a predetermined central vertical plane.

Another object is to provide a tank supporting and turning apparatus which will support tanks of different diameters with their axes in a predetermined vertical plane common to that of a fixedly located welding head.

Another object is to provide a tank supporting and turning apparatus wherein chain driven, tank supporting wheels may be readily and quickly adjusted for the accommodation of tanks of different diameters, and wherein this adjustment may be effected without disconnecting or adjusting the chain, and without moving or in any way adjusting the power source that drives the chain. In this connection, one of the features of the invention resides in taking advantage of the chain in effecting lateral adjustment of the wheel carriages, as will appear more fully hereinafter.

A further object is to provide a tank supporting and turning apparatus which is sturdy in construction and wherein provision is made to support very heavy tanks by rubber-tired wheels without subjecting the rubber to excessive pressure.

A still further object is to provide tank supporting and turning apparatus which is economical to construct and wherein parts may be readily repaired or replaced when necessary.

Other objects and advantages of the invention will be apparent from the following description taken into conjunction with the accompanying drawings, in which:

FIG. 4 is an enlarged front elevational view of the apparatus shown in FIG. 1;

FIG. 5 is a cross-sectional view through one of the carriages and tank supporting wheels, taken on the line 5—5 of FIG. 4; and FIG. 6 is a transverse vertical sectional view taken on the line 6—6 of FIG. 5.

Figure 1:
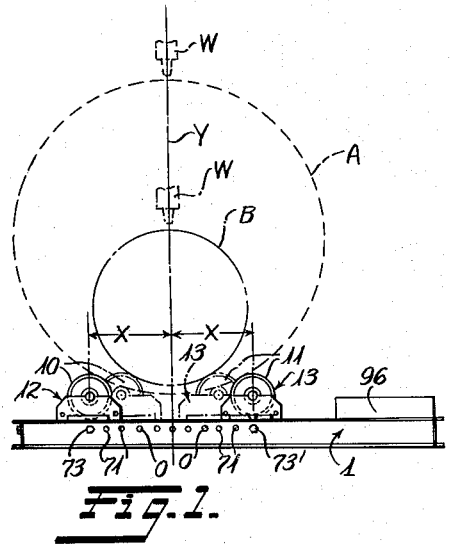
FIG. 1 is a front elevational view of the tank supporting and turning apparatus embodying the principles of the present invention shown associated with a fixedly located welding head, showing in full lines the position of the wheels for supporting a large tank, and showing in dot-and-dash lines the position of said wheels for supporting a relatively smaller tank.
Figure 2:
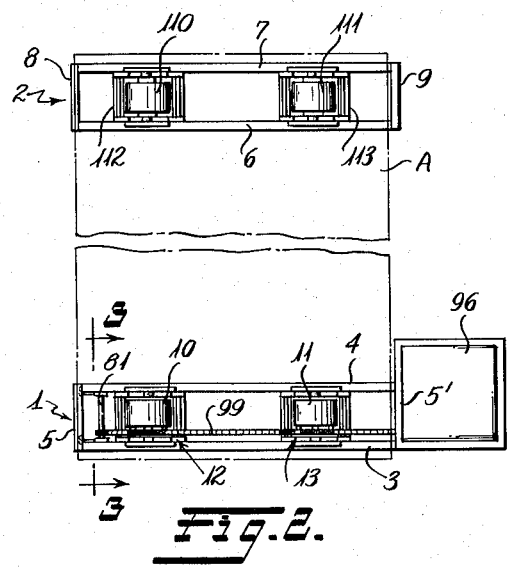
FIG. 2 is a plan view of the apparatus shown in FIG. 1 with the welding head omitted.

Referring now more specifically to the drawings, the numeral 1 indicates, generally, a front frame or trackway, while numeral 2 indicates, generally, a rear frame or trackway, the latter being disposed parallel to the former in spaced relation thereto. The spacing between the trackways will obviously depend upon the length of the tank to be supported.

The trackway 1 includes a pair of channel members 3 and 4 disposed in spaced parallel relation, with the channels thereof facing away from each other. Transverse channel members 5 and 5' are welded to the ends of the members 3 and 4 to rigidly secure them together. Another pair of channel members 6 and 7 are similarly positioned to form the rear trackway 2 at the opposite end of the apparatus. A pair of transverse channel members 8 and 9 similarly connect the opposed ends of the members 6 and 7. The channels of the trackways 1 and 2 are bolted or otherwise fixed to a floor so that the trackways remain parallel.

A pair of tank-turning wheels 10 and 11 are adapted to be mounted on carriages 12 and 13, which are slidably received in the trackway 1 to enable adjustment of said wheels to the desired position along said trackway.

The wheel 10, see FIG. 5, includes a cylindrical hub 14 which extends through central apertures 15 and 17 formed in a pair of spaced steel discs 19 and 21. The hub 14 is welded at 14a to the disc 19 to prevent relative longitudinal movement. The discs 19 and 21 are each provided with an annular shoulder, 23 and 24, respectively, formed in opposed relation on the inner surfaces of said discs adjacent the outer periphery thereof. A cylindrically shaped steel member 25 is positioned in the recesses provided by shoulders 23 and 24 and serves to support a tire 27, formed of rubber or the like, which constitutes the outer periphery of the tank-turning wheel 10. Peripheral raised portions or flanges 28 and 29 adjacent shoulders 23 and 24 serve to limit the amount of compression that can be exerted on tire 27 when a heavy tank is being supported. This construction prolongs the useful life of the tire 27.

A sprocket 30 is positioned in coaxial relation with respect to wheel 10, being maintained in spaced relation adjacent disc 19 by a plurality of spacer sleeves 31. Screws 32 secure the assembly together, passing in turn through sprocket wheel 30, spacer sleeves 31, and disc 19. The inner end of each screw 32 is secured in a threaded aperture one end of a spacer member or brace 33 disposed between discs 19 and 21, the other end of each brace 33 being secured in position by a screw 34 inserted through an aperture in disc 21. The sprocket 30 includes a central aperture 35, of a size and for a purpose to be described hereinafter.

The carriage 12 comprises a pair of plates 36 and 37 having their lower ends received in the trackway 1 along the opposed inner surfaces of channel members 3 and 4. Plates 36 and 37 are provided with elongated horizontal bars 38 and 39, respectively, suitably secured, as by welding, on the respective outer faces thereof. Bars 38 and 39 constitute ledges that overlie the upper flanges of channel members 3 and 4 in sliding relation thereto, and serve to support and slidably mount the carriage 12 on trackway 1 for horizontal adjustment along said trackway. The plates 38 and 39 are secured together in spaced relation by transverse braces 41 located near their lower edges, as best shown in FIG. 6.

The wheel 10 is rotatably mounted on an axle 43, FIG. 5, with a bearing sleeve or bushing 45 interposed between the hub 14 and said axle. The axle 43 also extends in non-contacting relation through aperture 35 of sprocket 30 and rests at its opposite ends in aligned depressions 47 and 49 formed in the upper edge of plates 36 and 37 respectively. A collar 48 is secured to the axle 43 between the wheel 10 and plate 37 and prevents any appreciable axial movement of said wheel relative to the carriage 12.

Figure 3:
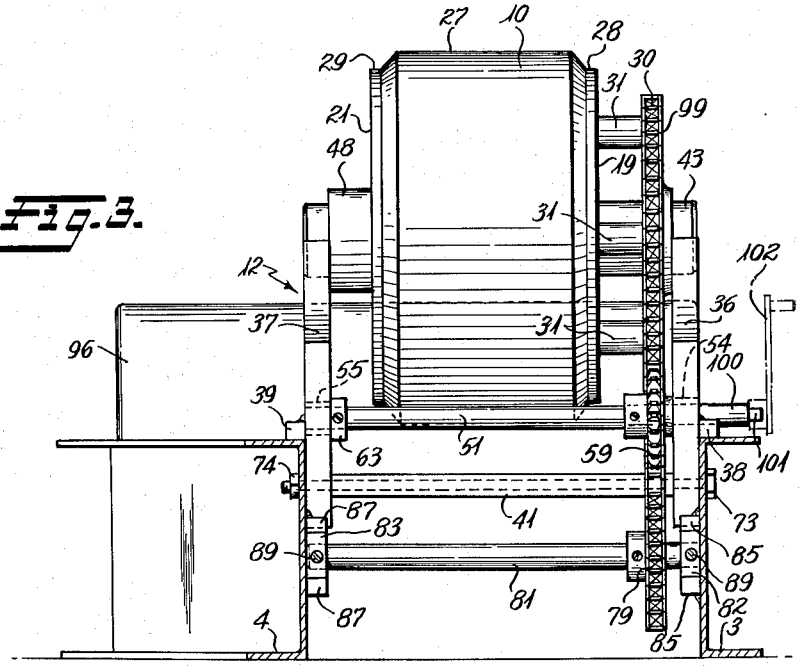
FIG. 3 is an enlarged sectional view through the front trackway, taken on line 3—3 of FIG. 2.

A shaft 51, FIGS. 3, 4 and 6, is mounted between the plates 36 and 37 at a level slightly above the trackway 1. An idler sprocket 59 is fixed on shaft 51 and the opposite ends of said shaft are journalled in aligned bushings 54 and 55 mounted in openings in plates 36 and 37 at one end thereof. At the other end of the plates 36 and 37, another shaft 53, FIGS. 4 and 6, is journalled in bushings 56 and 57 in plates 36 and 37 and carries a second idler sprocket 61. Sprockets 59 and 61 lie immediately inwardly of plate 36 in coplanar relation with sprocket 30.

Collars 63 and 65 mounted on the shafts 51 and 53, respectively, remote from the sprockets 59 and 61, prevent axial movement of said shafts relative to the plates 36 and 37.

Aligned apertures 67 and 68, FIG. 5, are formed in the lower portion of the plates 36 and 37. Channel members 3 and 4 include a plurality of opposed pairs of horizontally aligned apertures 71, and when the carriage 12 is in correctly adjusted position on the trackway 1, the apertures 67 and 68 are aligned with one pair of the apertures 71 and a bolt 73 is inserted therethrough. Bolt 73 passes through the appropriate aperture 71 in channel member 3, through apertures 67 and 68 in plates 36 and 37, respectively, and through the aligned aperture 71 in channel member 4, and is secured at its opposite end by a nut 74 to hold the carriage 12 locked in correctly adjusted position.

It will be noted from the foregoing description, that carriage 12 is constructed so that the wheel assembly 10 with its sprocket assembly 30 can be easily and quickly removed from the carriage 12 by bodily lifting the same therefrom. It will also be apparent that the tire 27 can readily be replaced, should occasion require, by removing the wheel from the carriage 12 and simply sliding the sprocket and wheel assembly off the left end of the axle 43 and then removing the screws 34 and plate 21.

Wheel 11 and carriage 13, which are also slidably mounted in the trackway 1, are identical in construction to the carriage 12, like parts having been identified in the drawings with the same numerals distinguished by a prime mark.

An idler sprocket 79, FIGS. 3 and 4, is mounted at one end of the trackway 1 in coplanar relation with the sprockets 59, 30 and 61 of carriage 12, and with sprockets 59', 30' and 61' of carriage 13. The sprocket 79 is mounted on a shaft 81 which is journalled at its opposite ends in bearing blocks 82 and 83. Block 82 is mounted for longitudinal movement between guides 85 welded to the inner face of channel member 3 and block 83 is similarly mounted between guides 87 welded to the inner face of channel member 4. Adjusting bolts 89 have their inner ends threaded into openings 91 in the blocks 82 and 83 and extend through apertures in transverse member 5 and have the head thereof in engagement with the vertical web of said member.

A conventional variable speed drive or power source 95, FIG. 4, is positioned in a housing 96 at the opposite end of the trackway 1, and includes a drive shaft 97 having a drive sprocket 98 thereon in coplanar relation with the other sprocket members described above. A drive chain 99 extends from the drive sprocket 98, passes under the idler sprocket 61', over the sprocket 30' to drive the wheel 11, under the idler sprockets 59' and 61, over the sprocket 30 to drive the wheel 10, and under the sprocket 59, around idler sprocket 79 and back to the drive sprocket 97. The bolts 89 are adjustable to position the blocks 82 and 83, which carry the shaft 81 and idler sprocket 79 to take up any excess slack in the chain 99 and thus assure that said chain will remain in driving engagement with the wheel-drive sprockets 30 and 30'.

At the rear of the assembly, a pair of tank-turning wheels 110 and 111, FIG. 1, are supported on carriages 112 and 113 slidably mounted in trackway 2. The wheels 110 and 111 and the carriages 112 and 113 are similar in construction to wheels 10 and 11 and carriages 12 and 13 and are therefore not described in detail here. The wheels 110 and 111, however, preferably serve only as idler rolls and need not be drivingly connected to drive means 95. Accordingly, the chain-and-sprocket drive assembly shown and described with respect to carriages 12 and 13 can be entirely dispensed with in the case of wheels 110 and 111. However, it is to be understood that the carriages 112 and 113 are securely locked in desired position along the channel members 6 and 7 in the same manner as the carriages 12 and 13 are locked to channel members 3 and 4, and that the wheel 110 is always placed in a position in axial alignment with wheel 10 and wheel 113 is always axially aligned with wheel 11.

Adjustment of the carriages 12 and 13 along the trackway 1 is successively made with the drive sprocket 98 idle and the bolts 73 and 73' removed. Adjustment is greatly facilitated by providing at least one of the shafts 51 or 53 of the carriage 12, or shafts 51' or 53' of the carriage 13, with a forwardly extending portion 100 having a squared end 101. A suitable crank 102, such as illustrated in dot-and-dash lines in FIG. 3 can then be employed to rotate, say the shaft 51, with the result that the carriage 12 is caused to move along the chain 99 and slide along the trackway 1 until it reaches the desired position of adjustment. The bolt 73 is then inserted to lock carriage 12 to trackway 1. The locking bolt 73' of the other carriage 13 is then removed and this carriage can then be correspondingly adjusted and locked in the same manner as the carriage 12.

FIG. 1 illustrates the carriages 12 and 13 in full lines, in a position corresponding to the maximum extent to which said carriages can be moved apart. It will be noted that the axles of the wheels 10 and 11 are disposed equal distances, marked X, on either side of a predetermined vertical plane indicated by the line Y and that line Y is in the same vertical plane as the welding head W.

It will also be noted from FIG. 1 that the apertures 71 are equally spaced from each other and that corresponding apertures, marked O, O for identification on either side of the line Y, are spaced the same distance from said line. A continuous series of apertures are shown so that the carriages 12 and 13 can be positioned in non-central relation to the line Y should such positioning be desired. It will be further understood that the wheels 110 and 111 of trackway 2 are correspondingly adjusted so that their axes too are the same distance X from the predetermined vertical plane Y. The wheels 10, 11 and 110, 111 are thus positioned to support the large tank A.

FIG. 1 shows, in dot-and-dash lines, the position to which the carriages 12 and 13 may be moved to support the tank B, which is of substantially smaller diameter than the tank A. The welding head W is indicated in dot-and-dash lines to illustrate the manner in which it is vertically lowered to appropriate position to effect a circumferential weld on tank B.

In operation, when the carriages 12, 13, 112 and 113 have been correctly adjusted, a tank is cradled therebetween on wheels 10–11 and 110–111 preparatory to welding. The welding head W is adjusted vertically to position it in proper relation to the tank to effect a welding operation. Power from the drive means 95 serves to drive sprocket 98 and chain 99 to turn wheels 10 and 11 and rotate the tank at the desired speed for circumferentially welding a head in place, seam, etc.

It will be understood that various changes may be made in the arrangement and in the details of construction of the parts of the apparatus shown herein without departing from the principles of the invention or the scope of the annexed claims.

I claim:

1. Tank supporting and turning apparatus, comprising: a trackway; a pair of wheel carriages mounted for guided movement on said trackway; a wheel mounted on each of said carriages on a horizontal axle lying above said trackway and perpendicular thereto; drive sprockets fixed to each of said wheels, said carriages each having a pair of idler sprockets positioned below the respective drive sprockets, one on each side of said drive sprockets; a driven sprocket at one end of said trackway; an idler sprocket at the other end of said trackway, said sprockets being all disposed in the same vertical plane with the outer ones of said pairs of idler sprockets having their lower extremities terminating at the same level as the upper extremities of said driven sprocket and of said idler sprocket at the other end of said trackway; an endless chain trained over said driven sprocket and said idler sprocket at said other end of said trackway, said chain passing under the idler sprockets of the respective carriages and over said drive sprockets to convey power to said wheels; and means connected with said driven sprocket for driving the same.

2. The apparatus of claim 1 wherein said idler sprocket at said other end of said trackway is adjustable to tension said endless chain.

3. The apparatus of claim 1 wherein at least one of said idler sprockets of each carriage is fixedly mounted on a rotatable shaft having a portion thereof projecting outwardly from the respective carriage, and wherein means are provided for facilitating rotation of said projecting portions to move said carriages along the length of said chain when said chain is stationary.

4. Apparatus for use in a tank supporting and turning apparatus having a pair of parallel rails defining a wheel carriage trackway, comprising: a wheel carriage mounted on said trackway and including spaced parallel plates having their lower portions positioned adjacent the inner faces of said rails; members projecting from the outer faces of said plates and overlying the respective rails to permit said carriage to slide along said trackway; a wheel rotatably supported on an axle mounted upon the upper portions of said plates, said wheel having a drive sprocket secured thereto; idler sprockets mounted on said carriage on shafts disposed below said first-mentioned axle and on either side thereof, said sprockets being all disposed in the same vertical plane with the outer ones of said pairs of idler sprockets having their lower extremities terminating at the same level as the upper extremities of said driven sprocket and of said idler sprocket at the other end of said trackway; means locking said carriage in position on said trackway; a drive chain trained over said drive sprocket and under said idler sprockets, whereby said carriage may be moved without disengaging said main drive; and means for applying power to said drive chain to rotate said wheel.

5. Tank supporting and turning apparatus, comprising: a trackway; a pair of wheel carriages mounted for guided movement on said trackway; a wheel mounted on each of said carriages on a horizontal axle lying above said trackway and perpendicular thereto; drive sprockets fixed to each of said wheels, said carriages each having chain guide means positioned below the respective drive sprockets, one on each side of said drive sprockets; a driven sprocket at one end of said trackway, an idler sprocket at the other end of said trackway, and said sprockets and said chain guide means being disposed in the same vertical plane with the outer ones of said chain guide means having their lower extremities terminating at the same level as the upper level of said driven sprocket and said idler sprocket at the other end of said trackway; an endless chain trained over said driven sprocket and said idler sprocket at said other end of said trackway, said chain passing under the chain guide means of the respective carriages and over said drive sprockets to convey power to said wheels; and means connected with said driven sprocket for driving the same.

References Cited in the file of this patent

UNITED STATES PATENTS

| | | |
|---|---|---|
| 1,308,686 | Spirek | July 1, 1919 |
| 1,638,024 | Woodrow | Aug. 9, 1927 |
| 1,777,089 | Jansen | Sept. 30, 1930 |
| 1,993,519 | Miltenberger | Mar. 5, 1935 |
| 2,034,451 | Tripp | Mar. 17, 1936 |
| 2,385,321 | Miller | Sept. 18, 1945 |
| 2,462,702 | Yates | Feb. 22, 1949 |
| 2,609,917 | Gotthardt | Sept. 9, 1952 |
| 2,669,364 | Aronson | Feb. 16, 1954 |

FOREIGN PATENTS

| | | |
|---|---|---|
| 78,336 | Netherlands | June 15, 1955 |